Oct. 24, 1933.   S. J. NORDSTROM   1,932,322
PLUG VALVE
Filed Oct. 13, 1930
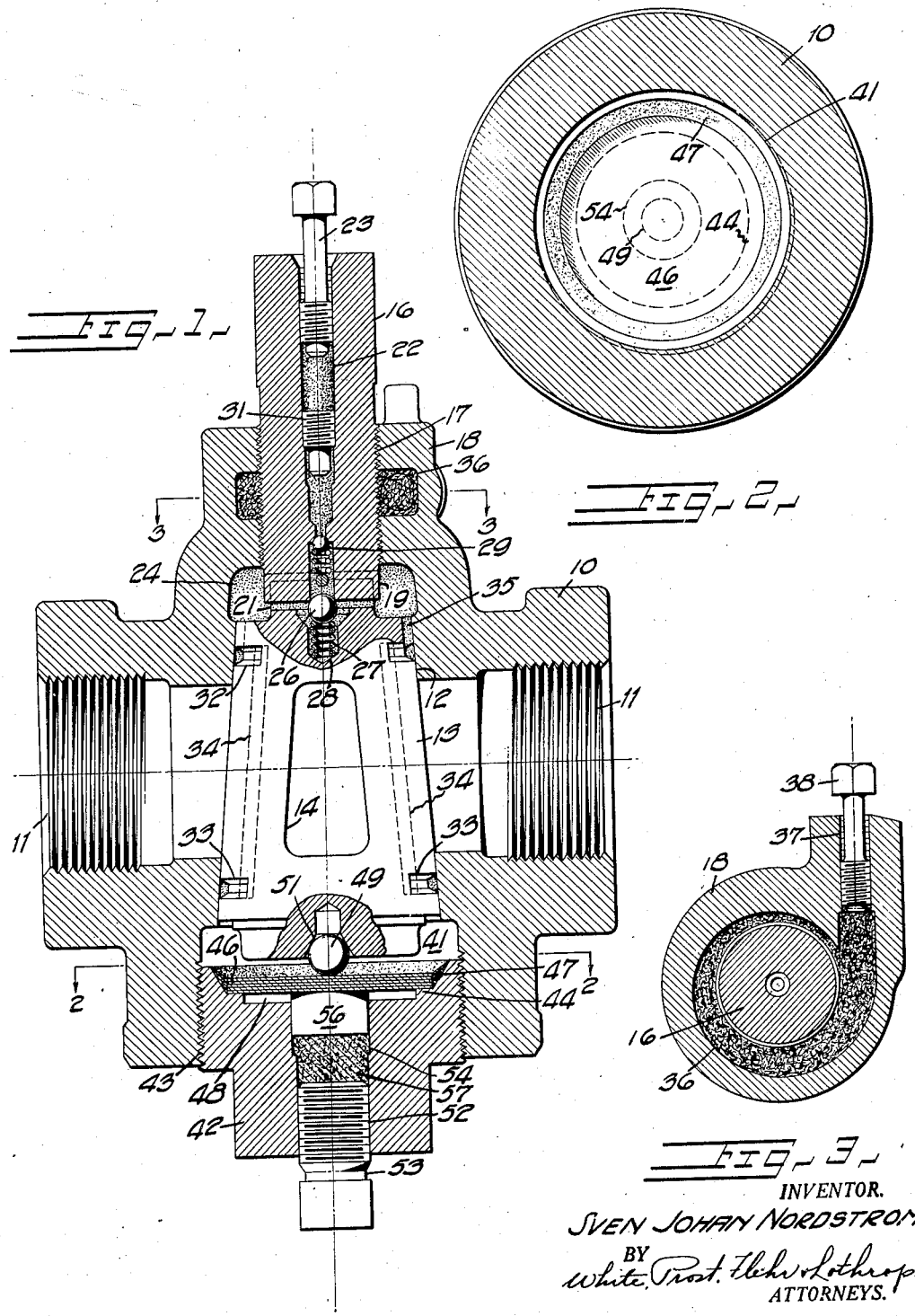
INVENTOR.
SVEN JOHAN NORDSTROM
BY
ATTORNEYS.

Patented Oct. 24, 1933

1,932,322

UNITED STATES PATENT OFFICE 1,932,322

PLUG VALVE

Sven Johan Nordstrom, Piedmont, Calif., assignor to Merco Nordstrom Valve Company, San Francisco, Calif., a corporation of Delaware Application October 13, 1930. Serial No. 488,253

2 Claims. (Cl. 251—93)

This invention relates generally to valves of the plug type having provision for yieldingly urging the rotatable valve plug into its cooperating seat. It has particular application to plug valves in which the plug member can be jacked loose from its cooperating seat, as by means of lubricant under pressure.

It is an object of the present invention to generally improve upon plug valves of the above character, whereby they are better adapted to certain operating conditions, as for example for controlling relatively high line pressures. It is a further object of the invention to devise a plug valve characterized by simplicity of construction, ease of manufacturing and assembly, and freedom from leakage and mechanical failure when subjected to high pressures.

Further objects of the invention will appear from the following description in which the preferred embodiment of the invention has been set forth in detail in conjunction with the accompanying drawing. It is to be understood that the appended claims are to be accorded a range of equivalents consistent with the state of the prior art.

Referring to the drawing:

Figure 1 is a side elevational view in cross section illustrating a valve incorporating the present invention.

Fig. 2 is a cross sectional detail taken along the line 2—2 of Fig. 1.

Fig. 3 is a cross sectional detail taken along the line 3—3 of Fig. 1.

The valve as illustrated in the drawing consists of a valve body or casing 10, having a longitudinal passageway 11 adapted to be connected to fluid pipe lines with which the valve is to be employed. Formed within the valve casing 10 and arranged laterally with respect to the passageway 11, there is a tapered valve seat 12. A tapered valve plug 13 is disposed within seat 12 and is provided with a port 14 which registers with passageway 11 for open position of the valve.

Turning of the valve plug can be accomplished by the conventional stem rigidly secured to the plug and packed with respect to the casing, but I prefer to utilize a rotatable operating head which is a part separate from the plug. Thus in Fig. 1 there is shown a rotatable operating head 16 which has a threaded engagement 17 with the casing portion 18. A driving connection between this head and the valve plug is formed by a rectangular lug 19 depending from the lower end of head 16, and which is normally disposed between the spaced lugs 21 formed upon the upper and small end of plug 13. Such a driving connection permits longitudinal jacking movement of the valve plug 13 without effecting corresponding longitudinal movements of the operating head.

Jacking the valve plug from its cooperating seat is preferably accomplished by the use of a viscous lubricant under pressure, and the same lubricant is preferably employed for supplying a lubricant film to the valve working surfaces. By valve working surfaces I have reference to the cooperating sealing surfaces between the valve plug and the casing. Thus the operating head 16 is shown provided with a longitudinal bore 22 which is threaded to receive the pressure screw 23, and which is adapted to receive a highly viscous lubricant in stick form. The lower or inner end of bore 22 communicates with a chamber 24 formed adjacent the upper or small end of valve plug 13. To prevent back flow of lubricant from chamber 24 thru bore 22 a ball check 26 is provided, which is normally urged toward closed position by the compression spring 27. Spring 27 is disposed within a recess 28 formed within the upper end of valve plug 13, and check 26 seats upon the lower end of operating head 16 to normally close bore 22. Additional intermediate check valves 29 and 31 can also be disposed within bore 22, between ball check 26 and the lower end of compression screw 23, in order to insure against back flow thru bore 22 in the event that ball check 26 does not seat.

Lubricant from chamber 24 is preferably supplied to the valve working surfaces thru a series of grooves to afford a sealed port effect, as claimed generically in Nordstrom Reissue Patent 17,375. This arrangement of grooves illustrated can be described briefly as comprising upper and lower lateral arcuate grooves 32 and 33, formed in the periphery of the valve plug 13. Cooperating longitudinal grooves 34 are formed in the tapered valve seat 12. Grooves 35 in the valve plug establish communication between the upper lateral grooves 32 and the lubricant chamber 24. When the valve is in closed position as shown in Fig. 1, lubricant from chamber 24 is supplied thru grooves 35 to the upper lateral grooves 32, and from these upper lateral grooves lubricant is supplied to longitudinal grooves 34 and lower lateral grooves 33. As the valve plug is turned from closed to open position the longitudinal grooves 34 exposed to the line pressure are cut off from the upper lateral grooves 32, and therefore cut off from communication with the lubricant chamber 24. In open position of the valve plug communication is again established between lateral grooves 32 and longitudinal grooves 34.

From the above it is apparent that as highly viscous lubricant within bore 22 is compressed by turning down screw 23, lubricant is supplied under pressure to chamber 24 and from thence to the valve working surfaces. By subjecting the lubricant to a sufficiently high pressure, the valve plug can be forced or jacked longitudinally from its seat.

Ordinarily for moderate or low pressure conditions the threaded engagement 17, which is lubricated by being in communication with chamber 24, is sufficient to prevent leakage between the casing and the operating head 16. For high pressure conditions, for which the present valve is particularly adapted, it is preferable to provide additional packing means. Thus as shown in Figs. 1 and 3 the inner periphery of casing portion 18 is formed with a recess or groove 36. A passage 37 communicates tangentially with groove 36, and is threaded to receive a compression screw 38. A resilient compressible packing material which is capable of flowing under high pressure, as for example shredded asbestos containing flasked graphite and impregnated with a viscous lubricating grease, is supplied to groove 36 thru bore 37, and is placed under high pressure by screw 38. As a result of the high pressure to which the packing is subjected the inner surface of this packing presses or flows into the threads on the operating head 16 to form a sealed engagement, which remains fluid tight as the operating head is turned. The tangential arrangement of screw 38 precludes the possibility of this screw becoming jammed against the head 16, and it also causes the packing material to progress in a circular path about the operating head as the packing material is fed into groove 36 thru passage 37. More adequate and uniform pressure of the packing material can be secured by forming the groove 36 spirally as shown in Fig. 3, thereby tending to jam or wedge the packing material toward the periphery of the head.

The resilient means for urging the valve plug 13 in a longitudinal direction into its seat is constructed as follows: At the lower or larger end of the valve plug the valve casing is provided with an opening 41 which is larger in diameter than the diameter of the large end of the plug, whereby the plug can be inserted or removed thru such opening. A closure member or closure plug 42 is fitted into opening 41, preferably by means of a pipe thread engagement 43. An annular shoulder 44 is formed upon the inner face of closure plug 42, and positioned upon this shoulder there is a flexible diaphragm 46. This diaphragm is preferably formed of a plurality of relatively thin sheet metal laminæ. The peripheral portion of diaphragm 46 is secured to and sealed with respect to the adjacent portions of plug 42, by means of a suitable weld connection 47. To facilitate making such a weld connection the closure plug 42 must of course be made of suitable material, as for example cast steel. A certain amount of flexing of diaphragm 46 is permitted by providing an annular recess 48 in closure plug 42, immediately below the diaphragm and within the annular shoulder 44. As normally positioned within the valve, diaphragm 46 is concentric with respect to the axis of rotation of valve plug 13, and in a plane substantially at right angles thereto. Interposed between the upper side of diaphragm 46 and the lower end of plug 13, there is a thrust member in the form of a hard metal ball 49, which is also alined with the axis of rotation of valve plug 13. This ball contacts with the center of diaphragm 46 and is retained within a conical seat 51 formed in the lower end of valve plug 13.

For normally exerting a force tending to flex diaphragm 46 upwardly, closure plug 42 is provided with a central bore 52 into which a screw 53 is threaded. Bore 52 has an upper cylindrical portion 54 into which a cylindrical plug 56 is fitted, the upper face of this plug contacting with the lower side of diaphragm 46. Interposed between screw 53 and the lower end of plug 56 there is a suitable resilient compressible filler 57, such as powdered flaked mica. The pressure upon the filler 57 can be varied by screw 53, and therefore the force tending to flex diaphragm 46 upwardly can be varied according to requirements. such force is transmitted directly thru ball 49 to the lower end of valve plug 13, to normally retain this plug within its cooperating seat. In general the upward force upon the valve plug should be sufficient to retain the plug properly seated for the line pressures with which the valve is to be employed, and to immediately return the plug into its seat after being jacked by application of lubricant under pressure.

It will be apparent from the above detailed description that diaphragm 46 is capable of withstanding relatively high line pressures without danger of mechanical failure. Because of the weld connection 47 there is no possibility of leakage occurring to the under side of the diaphragm thru the closure plug bore 52. In manufacturing the valve the diaphragm 46 can be welded to the closure plug apart from the remainder of the valve, after which this assembly can be threaded into the valve casing as shown in Fig. 1. The valve plug will turn easily after being jacked from its seat due to the axial anti-friction thrust bearing afforded by contact of ball 49 with diaphragm 46. In spite of its strength in withstanding line pressures diaphragm 46 is sufficiently flexible to permit adequate longitudinal movement of the valve plug for jacking purposes.

I claim:

1. In a rotary plug valve, a valve casing having a passageway therethrough for flow of fluid; a bore formed transversely of said passageway; a valve plug rotatably disposed within said bore; a closure member fitted to said casing adjacent one end of said valve plug and having an opening therethrough; a resilient diaphragm supported at its periphery solely by said closure member, the remaining portion of said diaphragm being spaced from said closure member to permit substantial flexing of said diaphragm; a thrust member interposed between one side of said diaphragm and the adjacent end of said plug; a screw member threaded in the opening through said closure plug; means contacting said diaphragm and disposed within said opening; and resilient compressible means positioned between said last-named means and said screw member.

2. In a rotary plug valve, a valve casing having a passageway therethrough for flow of fluid; a tapered seat formed transversely of said passageway; a tapered valve plug disposed within said seat; a closure plug threaded in said casing adjacent the large end of said plug; said closure plug having an opening extending therethrough; a laminated sheet metal diaphragm welded at its periphery to said closure plug to seal the interior of said valve with respect to the opening through said closure plug, the remaining portion of said diaphragm being spaced from said closure member to permit substantial flexing of said diaphragm; a combined thrust and bearing member interposed between the large end of said plug and one face of said diaphragm; a screw member threaded into the opening through said closure plug and accessible from the exterior of said valve; a piston member positioned in said opening and contacting with the other face of said diaphragm; and resilient compressible means interposed between said piston member and the inner end of said screw member.

SVEN JOHAN NORDSTROM.